United States Patent Office 3,528,771
Patented Sept. 15, 1970

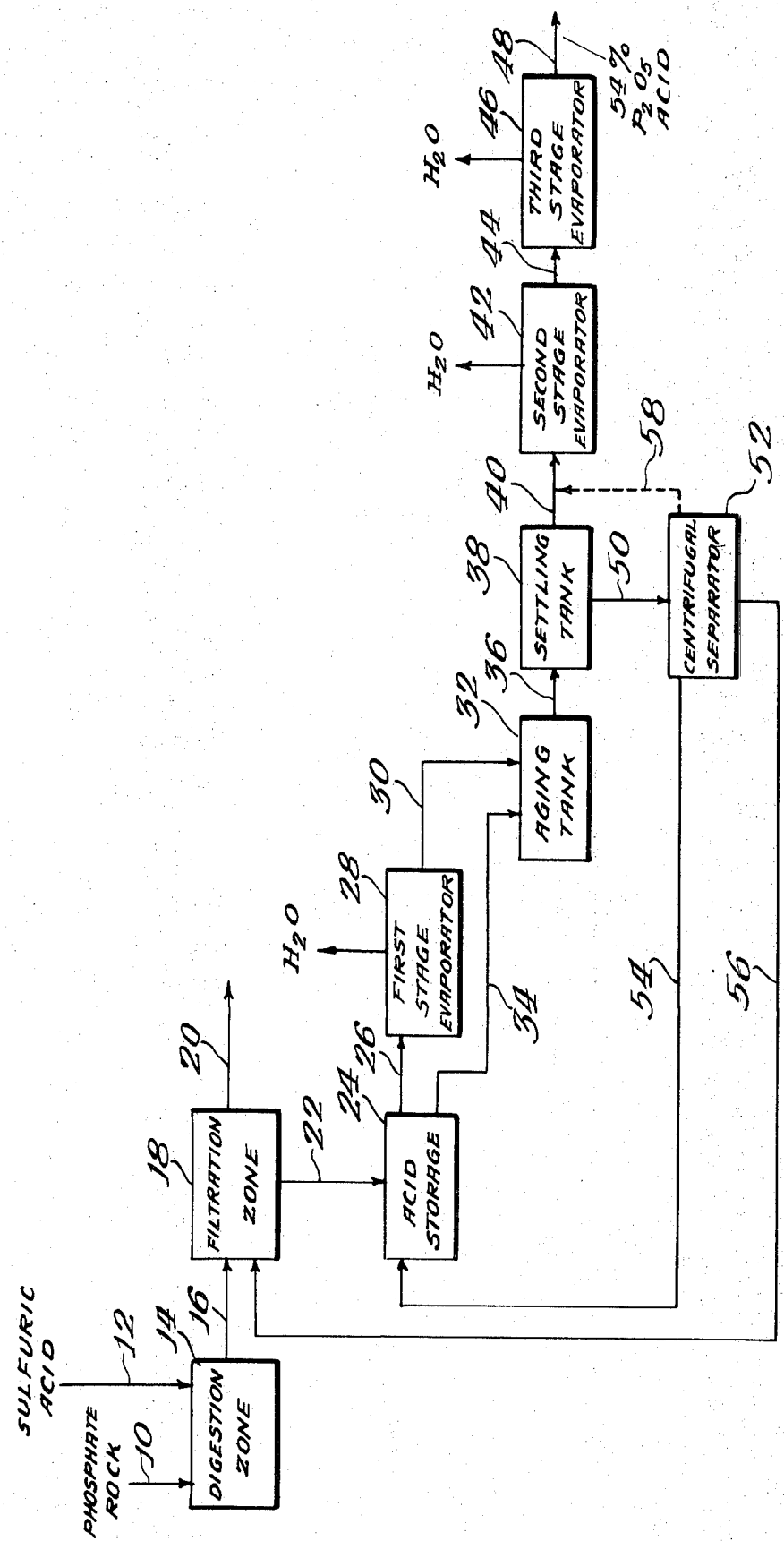

3,528,771
PHOSPHORIC ACID CLARIFICATION
George B. Shearon and Gerald J. Rubin, Lakeland, and Richard E. Bird, Auburndale, Fla., assignors to International Minerals & Chemical Corporation, a corporation of New York
Filed Oct. 10, 1967, Ser. No. 674,172
Int. Cl. C01b *25/18, 25/22*
U.S. Cl. 23—165
9 Claims

ABSTRACT OF THE DISCLOSURE

Phosphoric acid produced in accordance with the wet process and containing suspended solid impurities is subjected, while at a concentration of 35 to 45% $P_2O_5$, to a gravity settling operation for a period of time sufficient to separate it into a substantially solid-free liquid first fraction and a second fraction in which the solid impurities are concentrated. The substantially solid-free liquid first fraction may be used as such or concentrated further. The solid impurity-containing second fraction from the settling operation is then separated, such as by filtration, centrifugation, or the like, into a substantially solid-free liquid third fraction and a fourth fraction in which the solids are concentrated. The solid-containing fourth fraction is recycled to the attack or filtration portion of the wet process, while the liquid third fraction is combined with either the dilute acid product from the wet process or the liquid first fraction from the gravity settling operation.

BACKGROUND OF THE INVENTION

Phosphoric acid is produced in accordance with the so-called wet process by acidulating ground phosphate rock with sulfuric acid to produce a slurry consisting of phosphoric acid and insoluble impurities, which are mainly calcium sulfate. The slurry is filtered to separate the solid impurities from the phosphoric acid, which is generally at a concentration of about 25% to 35% by weight of phosphoric pentoxide ($P_2O_5$). The remaining dilute phosphoric acid is then usually concentrated, such as in one or more evaporating zones, to yield a commercial grade phosphoric acid containing at least about 54% by weight of $P_2O_5$. Two or more evaporation stages are usually employed for concentrating the acid for reasons of heat and equipment economy.

Wet process phosphoric acid contains a variety of impurities. The insoluble impurities produced by the digestion of the phosphate rock are substantially removed by the filtration step, but some small quantity of insoluble materials passes through the filter. In addition, impurities in the phosphate rock, such as iron, aluminum, silicon and fluorine, are put into solution during the reaction of the phosphate rock with the sulfuric acid. Concentration of the wet process phosphoric acid results in additional solids being formed and precipitated over an extended period of time to form a sludge consisting mainly of complex iron and aluminum phosphates and additional calcium sulfate. This is known in the art as post-precipitation.

The tendency of the sludge to form is proportionately increased as the concentration of the acid increases. Concentration of the dilute 25% to 35% $P_2O_5$ acid reduces the solubility of calcium sulfate and silicofluorides so that additional amounts of these materials precipitate as the dilute phosphate is concentrated. However, it has been found that the iron and aluminum phosphates will not start to precipitate until a concentration of about 42% to 48% $P_2O_5$ is reached, depending upon the purity of the starting phosphate rock. The precipitation of the iron and aluminum phosphates results in the loss of an appreciable quantity of phosphoric acid, which is recoverable only by involved and costly processing. The sludge also complicates the storage, handling and use of the concentrated phosphoric acid.

Many methods have been proposed and utilized for eliminating the sludge problem, but these have met with little commercial success. One solution which has been proposed is to treat the concentrated phosphoric acid with various chemicals to prevent the precipitation of the sludge. Other methods are based on the precipitation and removal of the sludge, consequently resulting in the loss of phosphoric acid.

SUMMARY OF THE INVENTION

This invention relates to an improved process for producing a clarified acid from wet process phosphoric acid.

In accordance with this invention, phosphoric acid is initially prepared in accordance with the wet method by the digestion of ground phosphate rock with sulfuric acid in a reaction zone to produce a slurry consisting essentially of soluble phosphoric acid and insoluble calcium sulfate. The slurry is passed to a filtration zone where it is filtered to substantially separate the precipitate which has formed from the phosphoric acid. The phosphoric acid obtained from the filtration zone usually has a concentration of up to about 35% $P_2O_5$.

At least a portion of the dilute phosphoric acid is then concentrated to produce an acid having a concentration of about 35 to 45% $P_2O_5$, preferably 37 to 40% $P_2O_5$. This causes additional calcium sulfate and other inert solids, but substantially no insoluble iron and aluminum phosphates, to form in solution and precipitate in the gravity settling operation which follows. As used in the art, the term "inert solids" means non-$P_2O_5$ containing solids consisting primarily of calcium sulfate and silicofluorides. This concentrated phosphoric acid solution is subjected to a gravity settling operation for a period of time sufficient to allow a major portion of its calcium ion content to precipitate as calcium sulfate and to be separated into a clarified, i.e., substantially solid-free, overflow first fraction and an underflow second fraction in which the inert solid impurities are concentrated.

A part of the potassium values is removed in the underflow as the relatively insoluble silica fluoride. This prevents its conversion into the more insoluble potassium ferric phosphatic compounds which form at the higher concentrations and facilitates the processing of the clarified acid into a merchant grade acid. This is due to the lower quantity of post precipitation (less calcium sulfate, potassium ferric phosphatic compounds and sodium compounds). In addition any post precipitation in the 52–54% concentrated acid forms more rapidly and in a more easily handled form because of the larger crystals produced.

The concentrated phosphoric acid solution is preferably aged unde mild agitation before it is introduced into the settling operation. The aging allow the use of a smaller settling tank and less overall processing time while producing a clearer acid, as compared to when it is not initially aged. The clarified overflow fraction from the settling operation may be used as such, but it is usually concentrated further.

The settling tank underflow is separated, such as by filtration, centrigufiation of the like, into a third fraction which is a substantially clear acid solution, and a fourth fraction in which the inert solid content thereof is concentrated. The third fraction may be combined with the settling tank overflow fraction, or may also be recycled and combined with the dilute phosphoric acid product from the wet process before at least a portion thereof is concentrated. The fourth fraction is recycled to the wet process and is introduced into the reaction zone or the filtration zone. In the event the fourth fraction is recycled to the filtration zone, it may be combined with the slurry obtained from the reaction zone and filtered therewith or it may be recycled directly to the filter. The fourth fraction is preferably deposited on the filter at a point where the gypsum cake has already formed. This aids in the prevention of filter cloth blinding that could be caused by any small crystals in the fourth fraction.

DESCRIPTION OF THE PREFERRED EMBODIMENTS

In order to facilitate the understanding of the present invention, reference will now be made to the accompanying drawing which is a flow diagram of a preferred embodiment of this invention.

Referring to the drawing, phosphoric acid is initially prepared in accordance with the so-called wet method by passing phosphate rock through line 10 and sulfuric acid through line 12 into digestion zone 14 where they are reacted. The phosphate rock is typically of a size about 60% minus 200 mesh and has a $P_2O_5$ content in the range of about 29% to 32% by weight. The sulfuric acid generally is of a concentration of about 40% to 70%, but weaker and stronger acids are also sometimes employed.

In most cases digestion zone 14 will consist of one tank provided with suitable agitation means in which the phosphate rock is initially mixed with recycled slurry of phosphoric acid and calcium sulfate to form a process slurry containing unreacted rock. The process slurry is then introduced into one or more reaction tanks provided with agitation means where the sulfuric acid is introduced and the phosphoric acid-producing reaction takes place. The reaction between the phosphate rock and the sulfuric acid to produce phosphoric acid and the by-product calcium sulfate (gypsum) usually takes place in several tanks which are interconnected so that the process slurry serially flows from one tank to the next. As the process slurry flows serially from one tank to the next, sufficient retention time is provided for the reaction to go to the completion and form phosphoric acid and crystalline calcium sulfate.

A final reactant slurry, consisting of product phosphoric acid and solid calcium sulfate, is withdrawn from digestion zone 14 through line 16 and passed to a suitable means for effecting solids-liquid separation, such as filtration zone 18. Filtration zone 18 separates the slurry into a substantially solid calcium sulfate fraction and a crude phosphoric acid fraction. Inasmuch as it is impossible to separate all of the phosphoric acid from the gypsum in filtration zone 18, the cake of calcium sulfate obtained from filtration zone 18 is usually washed with water and/or dilute phosphoric acid before the calcium sulfate cake is withdrawn through line 20 and discarded. The crude phosphoric acid solution obtained from filtration zone 18 will generally have a concentration in the range of 25% to 35% by weight. The crude acidic phosphatic solution is passed through line 22 to dilute acid storage tank 24, which is mainly used as a surge tank and to supply a reservoir for the acidic solution to be clarified. No criticality is alleged for this portion of the process and any of the many variations of the so-called wet process which are found in patents and other publications may be used.

At least a portion of the acidic solution is withdrawn from tank 24 through line 26 and transferred to first stage evaporator 28 where it is concentrated. The concentrated phosphoric acid is passed from evaporator 28 through line 30 to aging tank 32. Aging tank 32 is preferably provided with suitable agitaion means. The phosphatic solution in aging tank 32 consists either solely of discharge from evaporator 28 or a mixture of concentrated acid from evaporator 28 and dilute acid which is passed directly from dilute acid storage tank 24 through line 34 to aging tank 32. The conditions under which first stage evaporator 28 operates, that is, what $P_2O_5$ content the acid is concentrated in evaporator 28, will determine which of these alternatives will be used.

The purpose of concentrating at least a portion of the acidic phosphatic solution in evaporator 28 is to cause additional calcium sulfate (an other inert solids) to precipitate in aging tank 32. However, it is preferred that substantially none of the iron and aluminum content of the acidic solution forms as solid phosphates since this would result in a loss of a portion of the $P_2O_5$ content of the acid. Therefore, the phosphoric acid solution in aging tank 32 will preferably be at a concentration at which calcium sulfate and other inert solids, but substantially no iron and aluminum phosphates, will form. The phosphoric acid solution in aging tank 32 will generally be at a concentration of about 35% to 45% $P_2O_5$. The optimum concentration is the highest concentration before substantially any of the iron and aluminum content of the solution forms as phosphates, i.e., generally about 37% to 40% $P_2O_5$. The specific optimum concentration for any given acid being clarified will vary indirectly as the iron and aluminum content of the starting phosphate rock varies. That is, the optimum concentration of an acidic phosphatic solution obtained from phosphate rock having a relatively low iron and aluminum content will be higher than for a phosphatic solution obtained from the phosphate rock having a relatively high iron and aluminum content.

The phosphoric acid in aging tank 32 is generally within the temperature range of about 145° to 190° F., more typically about 160° to 170° F. However, the temperature of the phosphoric acid in aging tank 32 is not critical and it is at the lowest possible level before the viscosity of the acid will cause operational difficulties.

The acidic phosphatic solution is retained in aging tank 32 for a period of time to allow for optimum gypsum crystal growth. Most of the growth occurs during the first two hours. More specifically, the solution is retained in the aging tank for a period of time sufficient to allow a major portion of its calcium ion content to come into equilibrium with the sulfate ion content of the solution and form calcium sulfate. This period of time will vary depending on factors such as the size of the tank, but will generally be from about 2 to about 8 hours with mild agitation. If desired, the formation of the calcium sulfate may be accelerated by adding a small amount, e.g., up to about 6%, of sulfuric acid to aging tank 32.

The acidic phosphatic solution is then transferred through line 36 from aging tank 32 to settling tank 38. The phosphoric acid is retained in settling tank 38 for a period of time sufficient to separate it into an overflow fraction which is a substantially clear acidic solution and an underflow fraction in which the solid impurities are concentrated in a small portion of the acid. That is, the retention time is sufficient to allow a major portion of the calcium sulfate which was formed in aging tank 32 to precipitate. The acidic phosphatic solution is preferably retained in settling tank 38 for a period of time sufficient to allow a major portion of the calcium ion content of the acid withdrawn from tank 24 to precipitate as calcium sulfate. The time required for achieving this result will vary for each individual system, but will typically be at least about 4 hours. Longer settling periods, e.g., about 8 to 12 hours, are more desirable.

The clarified phosphoric acid is withdrawn as overflow from settling tank 38 through line 40. The clarified acid may be used as such or it may be further concentrated as by passing it into second stage evaporator 42 and then through line 44 to third stage evaporator 46 to produce a final product in line 48 having a concentration of about 54% $P_2O_5$. The underflow fraction from settling tank 38 in which solid impurities are concentrated is passed through line 50 into centrifugal separator 52. Centrifugal separator 52 is preferably of the continuous type; however, a batch type of centrifugal separator or a battery of batch types or continuous centrifugal separators may be used. In centrifugal separator 52, centrifugal and centripetal forces affect the separation of the calcium sulfate and other solids from the settling tank underflow to produce a clarified acidic phosphatic solution which is removed through line 54 and transferred to tank 24. A solids-containing or sludge fraction is removed from centrifugal separator 52 and recycled through line 56 to filtration zone 18.

Various modifications of this process will be obvious. For example, the clarified solution obtained from centrifugal separator 52 may be transferred through line 58 to line 40 where it is combined with the settling tank overflow. The sludge fraction from centrifugal separator 52 may, if desired, be recycled to digestion zone 14. Various devices, such as filters, may be used in lieu of centrifugal separator 52 for separating the settling tank underflow into substantially solid-containing and liquid-containing fractions.

In order to give a clearer understanding of the invention, but with no intention to be limited thereto, the following specific examples are given:

EXAMPLE I

A Florida pebble phosphate rock containing about 31% $P_2O_5$ was acidulated with sulfuric acid to produce a slurry consisting of the soluble phosphate and insoluble impurities which were mainly calcium sulfate. The slurry was filtered to substantially remove the solid impurities and yield a crude phosphoric acid of the following analysis:

| | Weight percent |
|---|---|
| $P_2O_5$ | 30.4 |
| $Fe_2O_3$ | 1.02 |
| $Al_2O_3$ | 0.94 |
| F | 2.15 |
| CaO | 0.56 |
| $SO_3$ | 1.53 |
| $K_2O$ | 0.07 |
| $Na_2O$ | 0.09 |

This crude phosphoric acid was transferred to an acid storage tank from which acid was continuously withdrawn for clarification. About 75% of the acid withdrawn from the storage tank was concentrated in a first stage evaporator to a $P_2O_5$ content of about 40%. The concentrated phosphoric acid was introduced into a settling tank where it was combined with the remaining 25% of the acid withdrawn from the storage tank. The acid was retained in the settling tank for a period of about 8 hours to yield a clarified overflow fraction which was subsequently concentrated in second and third stage evaporators to produce a product acid of the following analysis:

| | Weight percent |
|---|---|
| $P_2O_5$ | 53.6 |
| $Fe_2O_3$ | 1.86 |
| $Al_2O_3$ | 1.83 |
| F | 1.53 |
| CaO | 0.63 |
| $SO_3$ | 2.73 |
| $K_2O$ | 0.08 |
| $Na_2O$ | 0.12 |

The sludge which was removed from the settling tank was passed into a centrifugal separator where it was separated into a substantially solid-free fraction and a fraction in which the solids of the settling tank underflow were concentrated. The substantially solids-free fraction from the centrifuge was recycled to the acid storage tank where it was combined with the filtrate from the filtration zone. The fraction in which the solids were concentrated was recycled from the centrifugal separator to the filtration zone.

A comparison of the foregoing two analyses shows removal of inert materials from the acid during the plant run as follows:

| | Weight percent |
|---|---|
| F (includes loss in evaporators) | 60.0 |
| CaO | 49.0 |
| $K_2O$ | 36.9 |
| $Na_2O$ | 32.5 |

The suspended solids content of the product acid obtained from the third stage evaporator in the above-described plant run averaged 3.83% by weight. When substantially the same process was carried out, except that the discharge stream from the first stage evaporator was transferred directly to the second stage evaporator in the conventional manner, the third stage evaporator product averaged 7.82% by weight suspended solids. Thus, the process of this invention was effective in reducing the solids content of the product acid about 51% by weight.

EXAMPLE II

The following is a material balance for the plant run such as described above. The components of the various fractions are given in the material balance in percents by weight and the various plant lines are indicated by numerals in parentheses corresponding to the reference numerals appearing in the drawing.

MATERIAL BALANCE

| | Percent $P_2O_5$ | Lbs./hr. |
|---|---|---|
| Dilute acid product (22) | 29.0 | 229,000 |
| Evaporator feed (26) | 29.5 | 203,000 |
| Evaporator discharge (30) | 40.0 | 150,000 |
| Direct settling tank feed (34) | 29.5 | 46,900 |
| Settling tank overflow (40) | 38.5 | 168,500 |
| Product acid (48) | 52.5 | 122,000 |
| Settling tank underflow (50) | 31.0 | 28,400 |
| Centrifuge clarified acid (54) | 36.0 | 20,000 |
| Centrifuge sludge (56) | 19.0 | 8,400 |

The above results clearly demonstrate the effectiveness of this invention in reducing post-precipitation.

Although this invention has been described in relation to specific embodiments it will be apparent that modifications may be made by one skilled in the art without departing from the intended scope of this invention as defined by the appended claims.

We claim:
1. In combination with a process for the preparation of phosphoric acid by the wet method wherein phosphate rock containing iron and aluminum impurities is reacted in a reaction zone with sulfuric acid to produce a slurry containing phosphoric acid and calcium sulfate and product wet process phosphoric acid is separated in a separation zone from said calcium sulfate, the steps of concentrating and clarifying said wet process phosphoric acid which comprise concentrating at least a portion of said wet process phosphoric acid to cause additional calcium sulfate, but substantially no iron and aluminum phosphates, to precipitate in the following gravity settling operation, subjecting said concentrated acid to a gravity settling operation for a period of time sufficient to allow a major portion of the calcium ion content thereof to precipitate as calcium sulfate, separating said concentrated acid into a substantially solid-free liquid first fraction and a second fraction in which said calcium sulfate is concentrated, separating said second fraction into a third fraction which is substantially free of calcium sulfate and a fourth fraction containing a major portion of said calcium sulfate, and recycling said fourth fraction to said wet process.

2. The process in accordance with claim 1 wherein said wet process phosphoric acid has a concentration of up to about 35% $P_2O_5$ and at least a portion of said wet process phosphoric acid is concentrated to provide in said gravity settling operation a solution having a $P_2O_5$ content of about 35% to 45%.

3. The process in accordance with claim 2 wherein said concentrated wet process phosphoric acid is aged for a period of time sufficient to allow a major portion of its calcium ion content to come into equilibrium with its sulfate ion content and form calcium sulfate before it is subjected to said gravity settling operation.

4. The process in accordance with claim 3 wherein said fourth fraction is recycled to said reaction zone.

5. The process in accordance with claim 3 wherein said fourth fraction is recycled to said separation zone.

6. The process in accordance with claim 5 wherein said third fraction is combined with said wet process phosphoric acid before at least a portion thereof is concentrated.

7. The process in accordance with claim 5 wherein a portion of said wet process phosphoric acid is concentrated and combined in said gravity settling operation with an unconcentrated portion of said wet process phosphoric acid.

8. The process in accordance with claim 7 wherein a portion of said wet process phosphoric acid is concentrated in an evaporation zone to provide in said gravity settling operation a solution having a $P_2O_5$ content of about 37 to 40%.

9. The process in accordance with claim 8 wherein said second fraction is subjected to centrifugal separation to separate it into said third and fourth fractions.

References Cited

UNITED STATES PATENTS

| | | | |
|---|---|---|---|
| 2,799,557 | 7/1957 | Seyfried et al. | 23—165 |
| 3,104,946 | 9/1963 | Veal | 23—165 |
| 3,333,929 | 8/1967 | Mazurek et al. | 23—165 |

FOREIGN PATENTS 890,811   3/1962   Great Britain.

EARL C. THOMAS, Primary Examiner

G. A. HELLER, Assistant Examiner